Nov. 4, 1930.   W. C. HUEBNER   1,780,678
PHOTOGRAPHIC PRINTING APPARATUS
Filed July 10, 1928   8 Sheets-Sheet 3
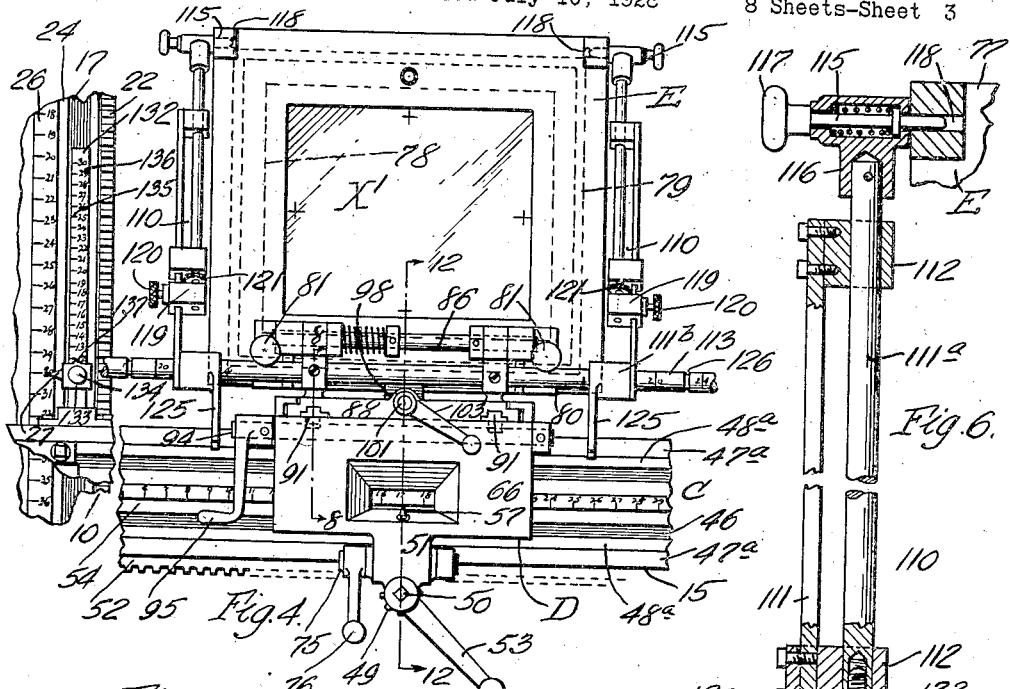
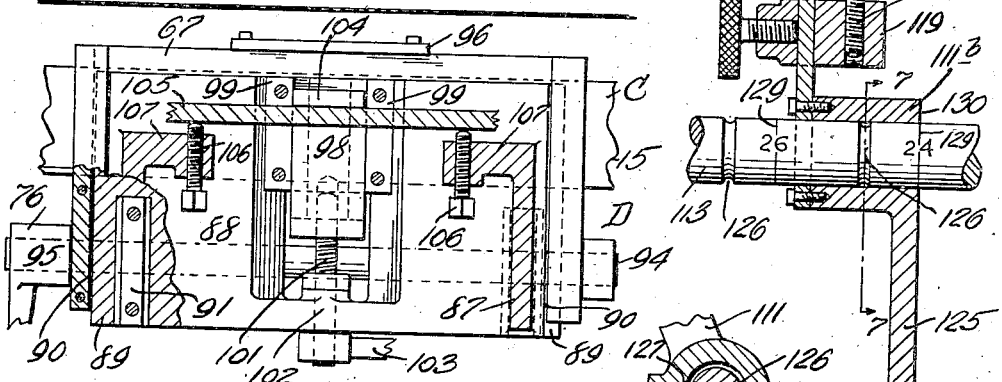
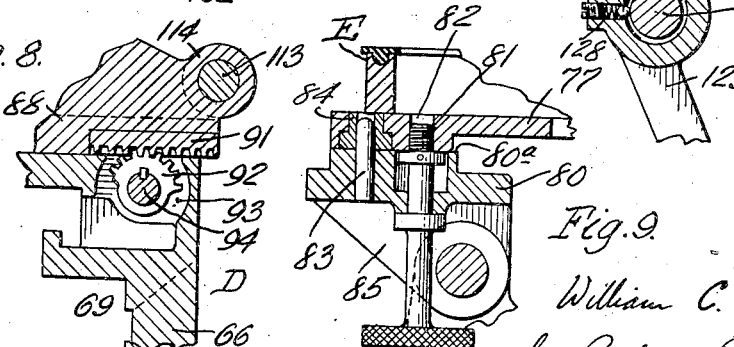
INVENTOR.
William C. Huebner
by Parker & Prochnow
ATTORNEYS.

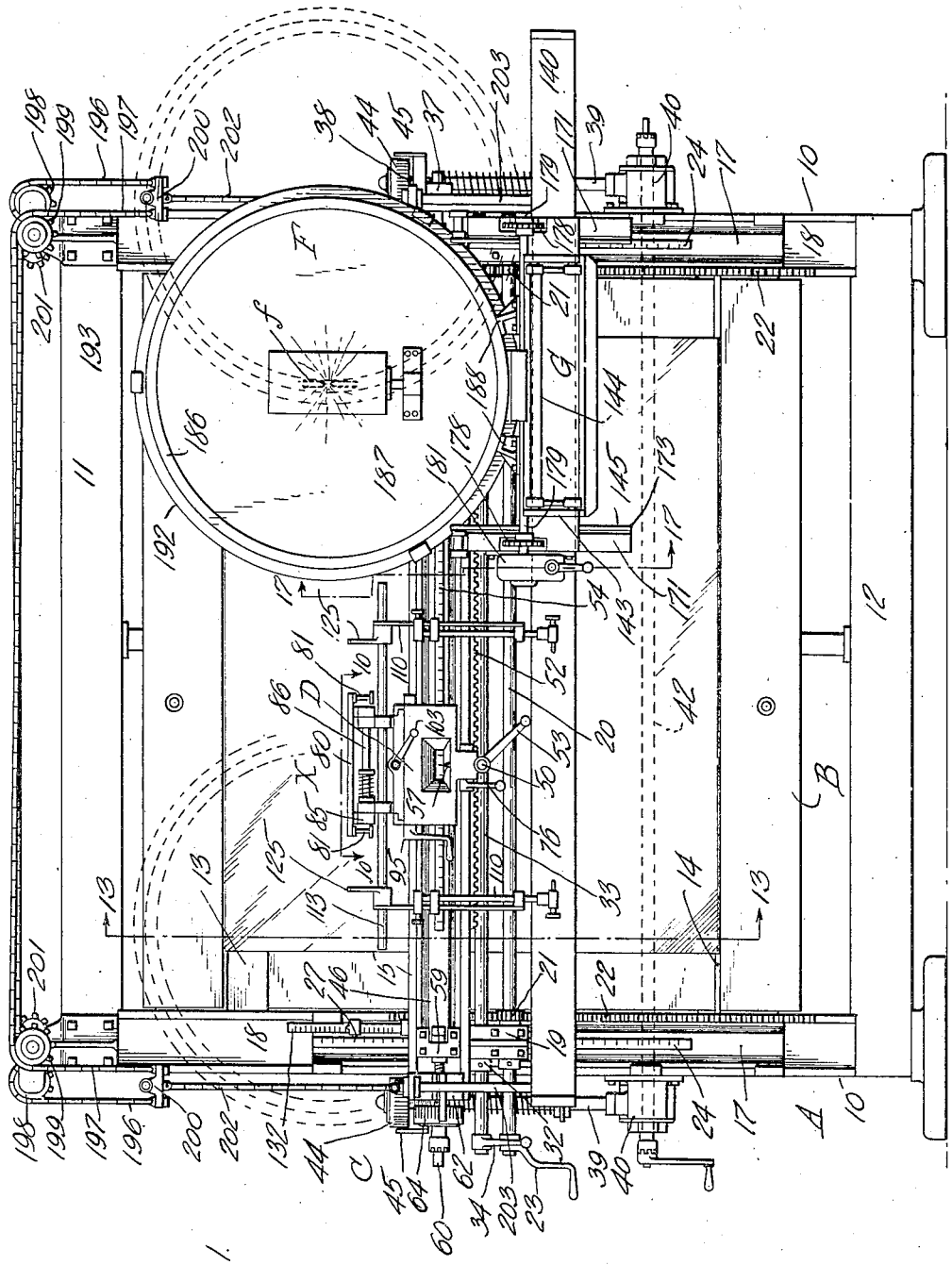

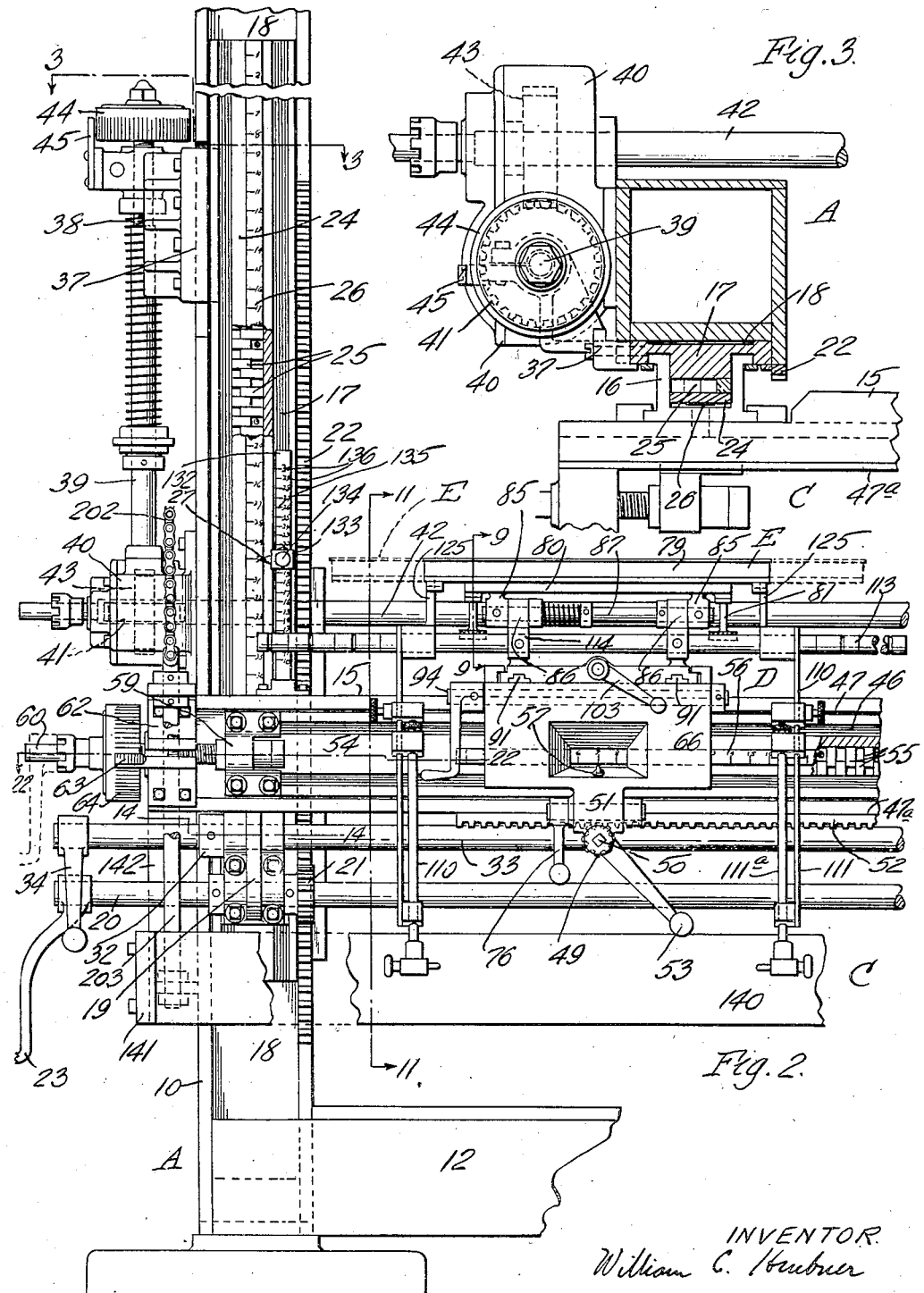

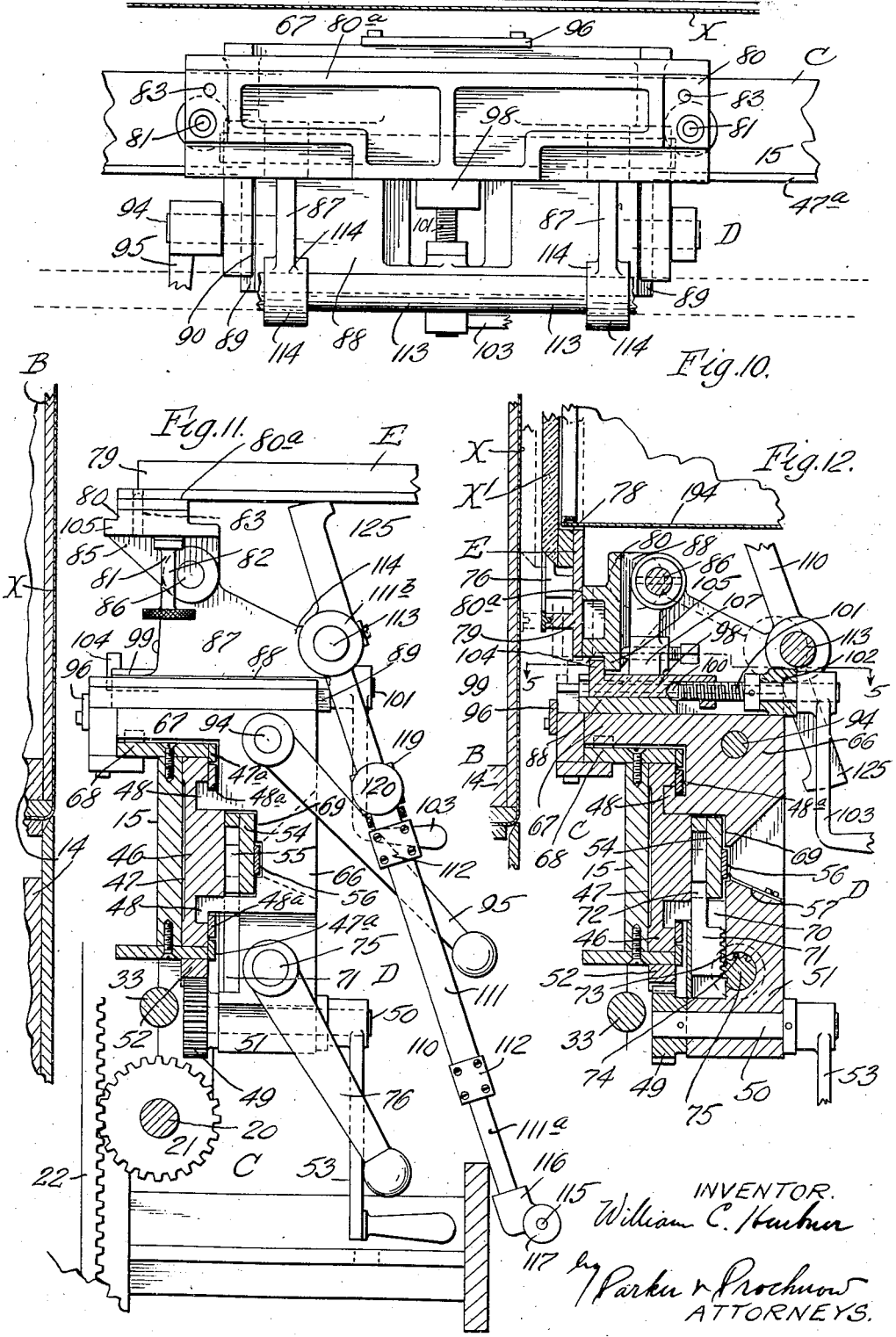

Nov. 4, 1930.  W. C. HUEBNER  1,780,678
PHOTOGRAPHIC PRINTING APPARATUS
Filed July 10, 1928  8 Sheets-Sheet 5
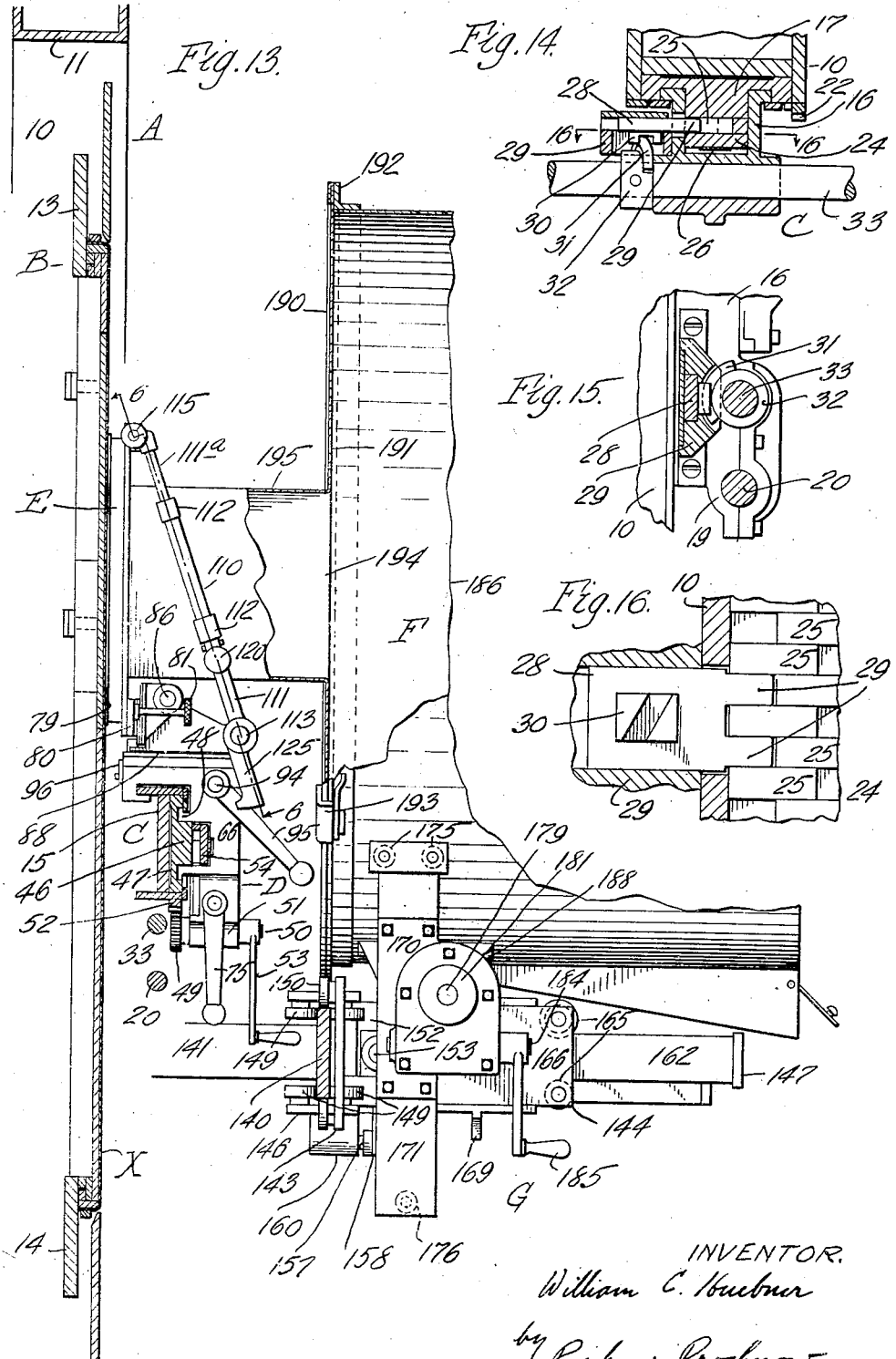

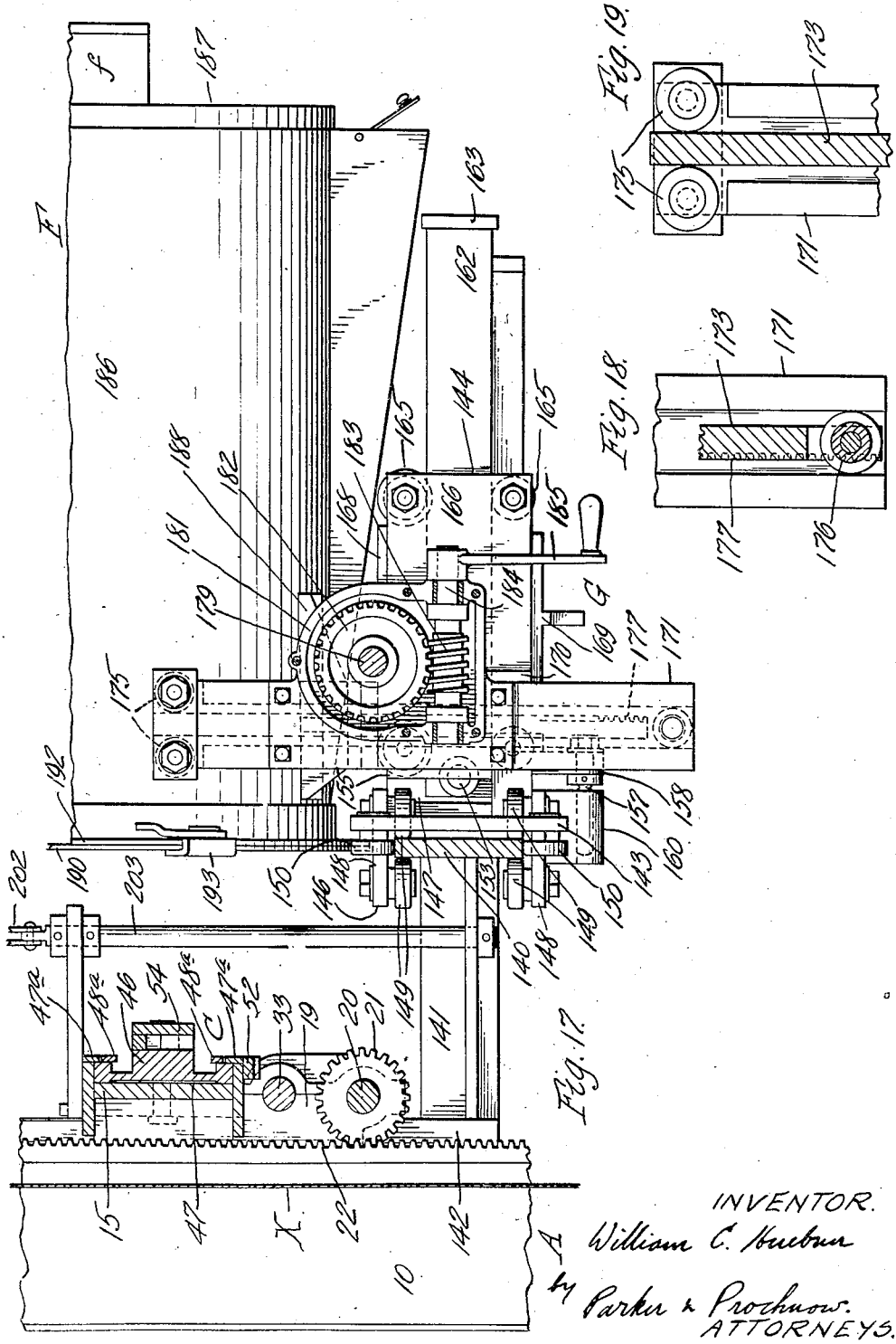

Nov. 4, 1930.  W. C. HUEBNER  1,780,678
PHOTOGRAPHIC PRINTING APPARATUS
Filed July 10, 1922   8 Sheets-Sheet 7
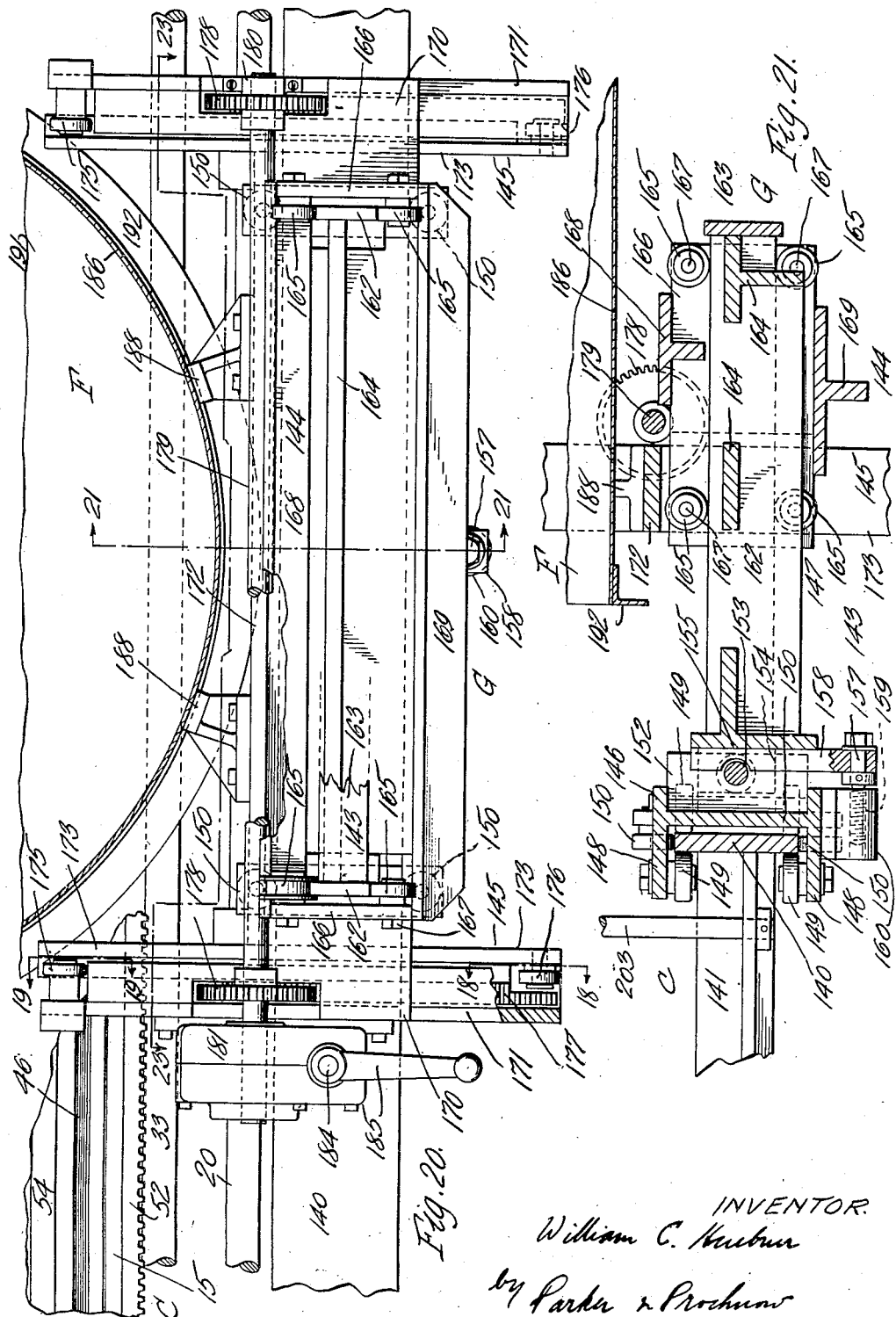
INVENTOR.
William C. Huebner
by Parker & Prochnow
ATTORNEYS.

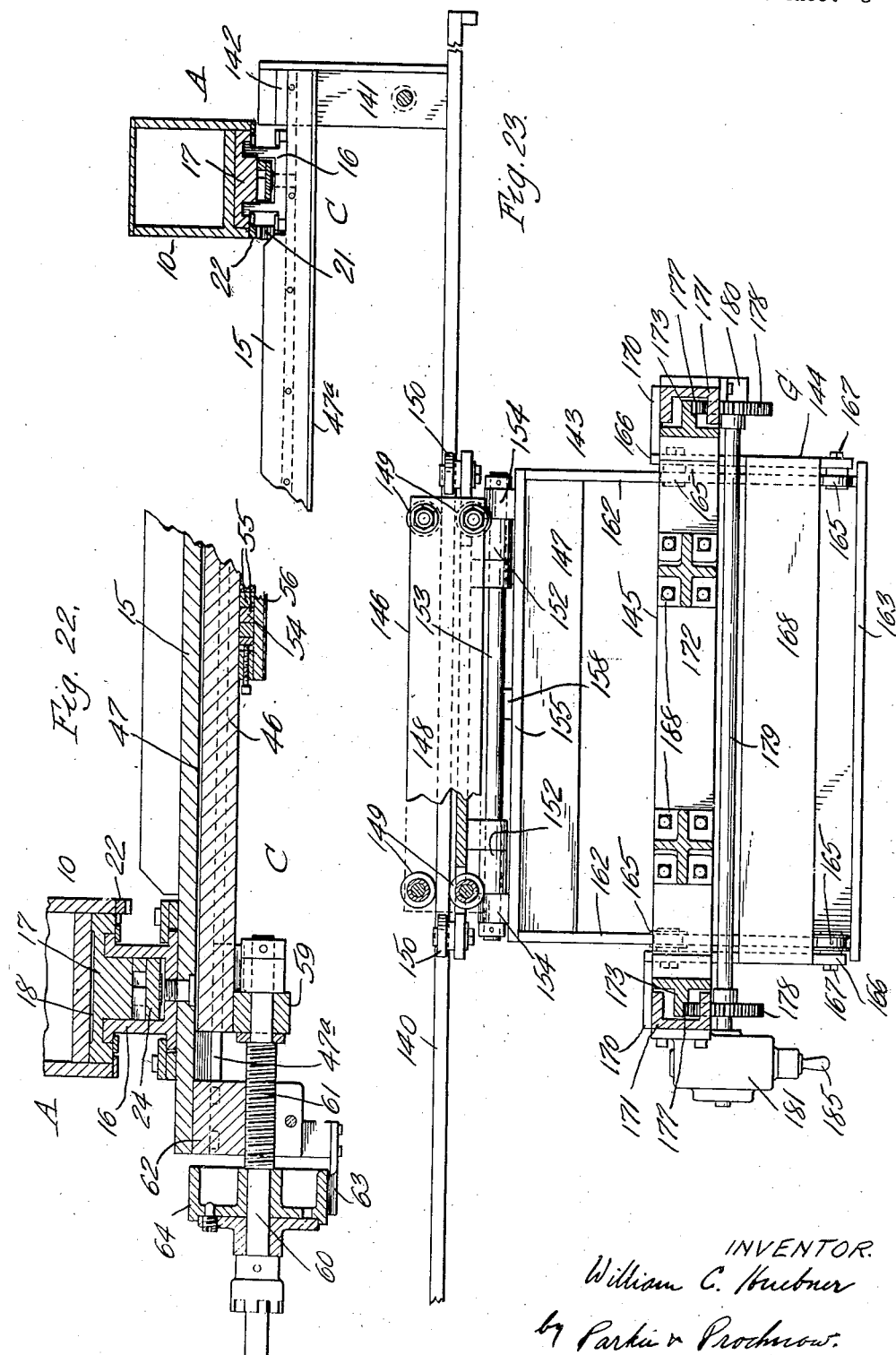

Patented Nov. 4, 1930

1,780,678

UNITED STATES PATENT OFFICE

WILLIAM C. HUEBNER, OF CHICAGO, ILLINOIS, ASSIGNOR TO HUEBNER-BLEISTEIN PATENTS COMPANY, OF BUFFALO, NEW YORK, A CORPORATION OF NEW YORK

PHOTOGRAPHIC PRINTING APPARATUS

Application filed July 19, 1928. Serial No. 291,650.

This invention relates to improvements in photographic printing or composing apparatus for photographing any desired number of like or different original prints in any required predetermined location and relative arrangement directly upon the sensitized surfaces of sheet metal or other press plates, which are afterwards suitably finished and used in mechanical printing presses for printing in one or several colors.

Such apparatus usually comprises a support or holder for the sensitized sheet metal or other press plate (hereinafter called the sensitized plate), a support or holder for a transparent negative or positive printing plate (hereinafter called the printing plate), means for causing intimate uniform contact of the surface of the sensitized plate with the printing plate, means for effecting light action upon said sensitized surface through the printing plate for producing the prints, adjusting means for causing a relative movement between the sensitized plate and printing plate parallel with the sensitized surface to enable prints to be made in desired predetermined locations on the sensitized plate, and means for effecting a movement of one of said surfaces relatively to the other for placing said surfaces into and out of contact and for providing clearance between the same during said relative parallel movements or adjustments therebetween.

In practical operation of machines of the character above indicated, it is necessary that provision be made for handling printing plates or negatives of different sizes. Furthermore, in practical, successful use of machines referred to, it is essential that registration of the printing plate or negative be obtained in a separable or detachable holder, since much more rapid and more accurate work is thereby obtainable. The holders or frames for the printing plates or negatives after the latter have been accurately centered or registered by suitable registering device (such as shown in my prior Patent 1,291,897, of January 21, 1919) are then placed in the photographic printing machine proper in a predetermined position with reference to the operating parts of the machine.

Heretofore, to permit of the predetermined registering of the printing plates in separable or detachable holders of different sizes, two general schemes have been employd. One of these utilizes holders all of the maximum size with corresponding means for securing the same on the photographic printing machine proper, the different size printing plates or negatives being accommodated in such holders or frames in different size openings in said frames, that is, the over-all dimensions of all of said holders or frames will be the same but they will be made with variable size openings to accommodate different size printing plates, as for instance, shown in my prior Patent 1,201,048 of October 10, 1916. The other general scheme has been to employ a carriage forming a part of the photographic printing machine, which carriage embodies adjustable members, so that different size frames or holders for the printing plates may be attached thereto. Such carriages heretofore have been of generally rectangular form, with two of the sides thereof adjustable toward and from each other, for the purpose indicated.

In those machines where a holder or frame is always of the same outside dimensions and the variations are in the openings, it is obvious that the same are necessarily very heavy and difficult to handle properly and also involve the use of a great deal of extra metal with consequent increased cost of manufacture. In the other type of machines referred to, wherein the carriage is made extensible to accommodate holders of different sizes, the holders themselves may be made relatively light and with only sufficient material therein to make the frame rigid, but the photographic printing machine proper necessarily employs a very heavy carriage, since the latter must be expansible to accommodate the maximum size holders which also increases the initial cost of the machine and entails considerable difficulty and labor in making the necessary adjustments from time to time in the carriage for receiving the different size holders.

One object of my invention is to provide an improved photographic printing or composing machine of the type hereinbefore referred to, wherein the minimum amount of material is employed for accommodating printing plate or negative holders of all sizes within the range for which the machine is designed, to the end that the weight and cost may be reduced to the minimum.

Another object of my invention is to provide a machine of the character indicated wherein all sizes of detachable printing plate or negative holders or frames may be used on the machine without the necessity of effecting any adjustments of any parts of the carriage for the different sizes, whereby the amount of time and labor required in changing the printing plates used on the machine is reduced to the absolute minimum.

A more specific object of my invention is to provide a machine of the character referred to, wherein provision is made for adjusting the printing plate holder in two directions at right angles to each other in a plane parallel to the plane of the usual sensitized plate and which includes as part of the means thereof a support to which all sizes of printing plate holders within the range of the machine may be attached in proper predetermined position and location, all in the same manner and by the same identical means and without requiring any adjustment of the attaching and locating and positioning means.

Other objects are to construct an apparatus of the sort described in which a printing plate holder can be detachably secured on its support and to construct said support in the form of an adjustable sub-carriage and to provide said carriage with means whereby said holder can be moved to a recumbent position in which printing plates can be easily mounted thereon or removed therefrom, and whereby said holder can be moved to an upright position for printing; also to construct a printing plate holder support or sub-carriage of novel construction in which the various required adjustments can be readily effected; also to construct the main frame and said sub-frame so that the latter can be adjusted on the former to any required predetermined location and locked on said carriage in this position; also to provide a sub-carriage having an attaching member to which said printing plate holder can be detachably secured and mounted so that the same can be placed in an inoperative, horizontal position for mounting or removing the printing plates therefrom and also in an operative, vertical position for printing; also to provide adjusting means on said sub-carriage for adjusting said attaching member and the negative holder mounted thereon in parallel relation to the metal plate.

Further objects are to construct a sub-carriage on which the lamp housing can be mounted and which carriage is movable on the main carriage in a direction parallel to the printing plate or sensitized surface, and which is provided with means for adjusting the lamp perpendicular to or towards and from the sensitized surface of the sheet metal plate, and the back of the printing plate; also to provide the sub-carriage for the lamp housing with means for vertically adjusting the lamp housing for positioning the horizontal axis thereof in central relation to printing plates of different sizes; also to provide adjusting means for effecting a limited arcuate movement of the lamp housing in a vertical plane at right angles to the printing plate to arrange the horizontal axis of lamp housing in perpendicular relation to said printing plane.

Other objects will be apparent from the appended description and claims and from the drawings in which:

Fig. 1 is a front elevation of my improved photographic printing and composing apparatus.

Fig. 2 is a fragmentary, enlarged front elevation of a portion of the main frame, main carriage and printing plate holder support or sub-carriage.

Fig. 3 is a fragmentary horizontal section, on an enlarged scale, on line 3—3, Fig. 2, of a portion of the main frame and main carriage.

Fig. 4 is a front elevation of the printing plate sub-carriage with the printing plate holder and printing plate in vertical or printing position.

Fig. 5 is a horizontal section, partly broken away, of the printing plate sub-carriage, on line 5—5, of Fig. 12.

Fig. 6 is a vertical, transverse section on an enlarged scale, on line 6—6, Fig. 13, of the adjustable means used for bracing the negative holder when the same is in printing position.

Fig. 7 is a fragmentary, vertical section thereof on line 7—7, Fig. 6.

Fig. 8 is a transverse, fragmentary, vertical section of the printing plate sub-carriage on line 8—8, Fig. 4.

Fig. 9 is a similar view thereof on line 9—9, Fig. 2.

Fig. 10 is a plan view of the printing plate sub-carriage with the printing plate holder detached, and taken approximately on line 10—10, Fig. 1.

Fig. 11 is a side elevation on an enlarged scale, of the printing plate sub-carriage and adjacent portions of the main carriage and sensitized plate holder taken on line 11—11, Fig. 2, the negative holder being in its recumbent position.

Fig. 12 is a fragmentary, vertical section of the printing plate sub-carriage, on line 12—12, Fig. 4, showing the printing plate holder in parallel relation to the sensitized plate, and with the printing plate out of contact with the latter.

Fig. 13 is a transverse, vertical section of the apparatus taken approximately on line 13—13, Fig. 1.

Figs. 14 and 15 respectively, are a horizontal section and a transverse vertical section of the means for locking the main carriage to the main frame.

Fig. 16 is a fragmentary, vertical section thereof on line 16—16, Fig. 14.

Fig. 17 is a side elevation of a portion of the lamp housing and its sub-carriage, and the adjacent portions of the main carriage.

Figs. 18 and 19 are vertical, transverse sections on lines 18—18, 19—19, respectively. Fig. 20, showing the means for adjusting and guiding the vertical slide of the lamp housing.

Fig. 20 is a front elevation, partly broken away, of the lamp housing sub-carriage showing a portion of the lamp housing in section.

Fig. 21 is a transverse, vertical section thereof on line 21—21, Fig. 20.

And Figs. 22 and 23 are combined sectional and plan views of portions of the lamp housing sub-carriage, corresponding to the section lines 22—22 of Fig. 2 and 23—23 of Fig. 20, respectively.

In general, the photographic printing and composing apparatus illustrated in the drawings comprises an upright main frame A having formed thereon or attached thereto a plate holder B on which is mounted the sensitized sheet metal plate X. Arranged on the main frame A and extending across the front thereof is a horizontal main carriage C movable relatively thereto in a vertical direction in parallel relation to the face of the sensitized plate X. On the main carriage C is arranged for horizontal movement parallel with the face of the sensitized plate, a printing plate sub-carriage D on which a suitable negative or positive printing plate X′, secured on a suitable holder E, is mounted.

A lamp housing F is also arranged for like movements on the main carriage C being supported for this purpose on an independent sub-carriage G.

The main frame A is preferably formed of a pair of parallel spaced uprights or hollow posts 10 rigidly connected at their upper and lower ends by cross members 11 and 12. This structure forms a rigid rectangular frame within which is arranged a sheet metal plate holder B, which can be of any suitable construction permitting a sensitized sheet metal plate X to be removably attached thereto, the holder being provided with suitable means for stretching the plate taut and smooth, with the sensitized surface extending in a vertical plane.

In the construction shown, the upper edges of all the sheet metal plates X are secured at exactly the same elevation or predetermined position on the holder B, a fixed horizontal attaching rail 13 being provided. The lower edges of the metal plates, regardless of their length are attached to a vertically adjustable attaching rail 14.

The main carriage C includes a horizontal cross bar 15 which extends across the front of the main frame with its ends extending laterally slightly beyond, and adjustably connected to the uprights 10, for vertical movements thereon, as before stated.

The adjusting mechanism employed for said main carriage C includes means for effecting a relatively quick primary movement thereof which can be indicated in units of measure, as for example, in inches, and means for effecting a fine, final adjustment thereof in small fractions of said units of measure.

The construction of the main frame and main carriage, and the coarse and fine adjustment for the latter will be only briefly described in the present application, as these features are substantially like the corresponding parts fully disclosed and illustrated in my copending application for Letters Patent, Serial No. 266,432, filed Mar. 31, 1928, and entitled Improvements in photographic printing apparatus.

The cross bar 15 is substantially the equivalent of the lower cross bar 26 of the carriage B in said application, and each end of said cross bar 15 is provided with a rearwardly extending slide 16 which slidably engages a vertical slide bar 17, one of which is arranged in a recess 18 in each of the uprights 10. Projecting downwardly from each of said slides 16 is a bracket 19, and a horizontal cross shaft 20, journalled near its ends in these brackets, is provided adjacent each of the uprights 10 with a pinion 21. These pinions mesh with fixed, vertical racks 22 on said uprights. By rotating the shaft 20 by means of a handle 23, the carriage C can be elevated or lowered by means of the racks and pinions, and the engagement of the slides 16 with the slide bars 17. Each of the slide bars 17 is provided with a vertical, fixed scale 24 composed of a plurality of accurately formed blocks 25 arranged in staggered relation substantially in the form of a rack. The width of the blocks corresponds to a unit of measure, such for example, one-half inch, and a graduated strip 26 fixed on the face of each scale indicates the number of inches travelled by the carriage bar 15 as shown by the movement of a stationary pointer 27 on the carriage past the scale 24. The foregoing represents the coarse adjustment of the main carriage C. When the latter has been moved the required number of inches, it is locked to the vertical scales 24 by means of locking devices such as shown in Figs. 2 and 14–16. Each locking device comprises a laterally movable plate 28 arranged in a casing 29 fixed to one side of the slide 16, and through which a hole is formed to permit the inner end of the plate 28, which is provided with spaced fingers 29, to be projected into and out of interlocking relation with the blocks 25 of the scales as shown in Fig. 16.

For this purpose each of the plates 28 is provided with a projection 30 having an oblique groove within which fits a cam 31 on a collar 32 fixed to a horizontal operating shaft 33 journalled at its ends in the aforementioned brackets 19 of the slides 16. By rotating the shaft 33 in one direction or another by means of a handle 34, the plates 28 are simultaneously operated by means of the cams 31. After the coarse adjustment has been made, the carriage can be given a further fine adjustment by shifting the slide bars 17, with the carriage C locked thereto, up or down relatively to the stationary uprights 10 of the main frame. For this purpose, each of the slide bars 17 has fixed thereto a laterally projecting bracket 37 which operatively engages a vertical screw 38 formed on a shaft 39, each of which is journalled at its lower end in a fixed bracket 40 on the adjacent upright 10 of the main frame and within which it is provided with a spiral gear 41. A horizontal shaft 42 extending across the rear of the main frame and having its ends journalled in said brackets 40 is provided with spiral gears 43 which mesh with the aforementioned spiral gears 41 on the shafts 39. The upper end of each shaft 39 is provided with a fixed dial or drum 44 graduated on its periphery into one hundred equal divisions. By rotating the shaft 42, the shafts 39 are simultaneously rotated, thus causing the graduated drums 44 to move past fixed pointers 45 on the brackets 37. The screw-threaded portion 38 of each shaft 39 is formed with ten threads to the inch, thus, one whole revolution of the shafts 39 causes an up or down movement of the brackets 37 and a travel of the slide bars 17 and carriage C of one-tenth of an inch, while the movement of each graduation of the drums 44 past the pointers 45 indicates a movement of said slide bars and carriage of one one-thousandth of an inch.

The printing plate sub-carriage D is likewise adjusted in its horizontal movements on the main carriage C by a primary coarse adjustment mechanism and a final fine adjustment mechanism similar to that just described for adjusting the main carriage on the main frame. The horizontal cross bar 15 of the main carriage is, therefore, provided with a slide bar 46 slidably engaging in a longitudinal recess 47 in said bar beneath confining strips 47ª. The sub-carriage D is slidably connected to and guided on this slide bar 46 as by means of offset ribs 48 on the rear of the carriage which engage in longitudinal recesses in said bar and are confined by strips 48ª. The carriage D is moved lengthwise of the cross bar 15 by means of a pinion 49 secured on a transverse shaft 50 journalled in a lug 51 at the lower end of the sub-carriage, said pinion 49 meshing with a fixed, longitudinal rack 52 secured on the lower face of the cross bar 15. By rotating the pinion 49 as by a suitable handle 53, the carriage may be shifted in one direction or another, its movements being indicated by a suitable scale 54 on the slide bar 46, and which comprises spaced blocks 55 surmounted by a graduated strip 56. The carriage D is provided with a suitable fixed pointer 57 which registers with the graduations on said strip 56 for indicating the travel of the carriage in units of measure.

One end of the slide bar 46 is provided with a forwardly extending bracket 59 in which is rotatably journalled and prevented from endwise movement one end of a shaft 60. This shaft is provided with a threaded portion 61 having ten threads to the inch, and which is operatively embraced by a correspondingly threaded portion of a bracket 62 fixed on the adjacent end of the carriage bar 15. The bracket is provided with a pointer 63, and adjacent thereto the shaft 60 is provided with a drum 64 graduated on its periphery into one hundred equal divisions, which cooperate with said pointer to indicate the endwise movement of the slide bar 46 in fractions of said units of measure by the rotation of said shaft and drum, in the manner explained in connection with the fine adjustment of the main carriage C.

The horizontal bar 15 of the main carriage, see Fig. 12 is substantially I-shaped in cross section, and the sub-carriage D includes a body portion or block 66, which in addition to being provided with the depending lug 51 and offset ribs 48 above mentioned, is also provided with an upper portion 67 which extends rearwardly and is formed with a depending guide portion slidably embracing the upper, rear flange 68 of the bar 15. The rear face of the block 66 is formed below the extension 67 with a recess 69 into which the scale bar 54 of the main carriage projects. Another recess or pocket 70 opening upwardly into the recess 69 is adapted to receive a vertically movable lock bolt 71 provided with fingers 72 which are movable into and out of locking engagement with the blocks 55 of the scale bar 54 for the purpose of locking the sub-carriage D to the slide bar 46 after the primary coarse adjustment has been made and so that the carriage may be shifted with the slide bar when making the final, fine adjustment of said carriage. For this purpose, the lock bolt 71 is formed with rack teeth 73 which mesh with a pinion 74 formed on a laterally disposed shaft 75 journalled in the lug 51 of the carriage, and which may be turned by a suitable handle 76 thereon for projecting the locking member 71 into or releasing it from engagement with the scale blocks 55. Any other suitable mechanism may, however, be provided for this purpose.

The transparent negative or positive printing plates X' used with the present apparatus are preferably in the form of rigid glass plates, a plurality of holders E of different sizes being provided to accommodate printing plates of different dimensions, and all of these holders E are constructed so as to be detachably secured on the carriage D.

Each printing plate X' is removably mounted on its holder E over a central opening 78 in the latter by suitable clips, and if, as in the present case, suction is employed for effecting close contact between the surfaces of the plates X and X', the holder is provided with a gasketed flange 79 surrounding the plate X' in spaced relation and engageable with the sensitized surface to form a seal and provide a suction chamber, as in the aforementioned application, Serial No. 266,432.

For securing the holder E to the sub-carriage, the latter is provided with a relatively elongated attaching block 80 (see Figs. 9 to 12) which block has a flat face 88 against which the rear face of the lower side bar or portion of the holder E engages. In actual practice, all of the holders E of the different sizes adaptable for use with my improved machine, will be provided with two accurately spaced dowel openings, the spacing of these dowel openings being identical on all of the holders. Preferably, these dowel openings will be formed in eccentrically adjustable bushings 84 (see Fig. 9) so that the position of the dowel holes may be adjusted relative to each other with an extreme degree of fineness. Within said dowel holes are received the projecting ends of two correspondingly located dowel pins 83, fixed in definite positions on the attaching block 80. The dowel holes of the holders referred to are utilized for accurately and predeterminedly locating and positioning the holders on such registering device as may be used in locating and positioning the printing plate or negative with respect to its holder. Consequently, by making use of these same dowel holes when attaching the holder to the attaching block 80, the printing plate or negative will be accurately located or positioned with respect to the attaching block 80 and all the other parts of the composing machine, and this will be true of all of the holders or plates of different sizes which are used with my improved machine and eliminates any necessity of adjusting any parts of the sub-carriage in determining the position and location of the different size holders thereon.

In order that the holders may be rigidly secured to the attaching block 80, so as to prevent accidental disengagement from the latter while the machine is being operated, attaching screws 81 are employed (see Fig. 9) which screws 81 are loosely swiveled in the block 80 and are adapted to have their threaded ends engage in correspondingly threaded openings 82 of the holders located adjacent the dowel bushings. It will further be observed that by attaching the holders in the manner above described, the holders are so secured that the apertures or opening 78 thereof through which the light is projected, as hereinafter described, are not obstructed, since the width of the attaching block 80 will preferably be somewhat less than the width of the lower side bar or member of the frames.

At the side opposite that to which the plate holders E are secured, the attaching member is provided with a pair of offset lugs 85 which are hinged to a short, lengthwise extending horizontal shaft 86 mounted in a pair of upstanding lugs 87 on a slide 88. This slide 88 is provided with guide portions 89 engaging in transverse horizontal grooves 90 to permit said slide with its attaching member 80 and the printing plate holder E thereon, to be adjusted towards and from the printing plane or sensitized surface of the sheet metal plate X.

By pivotally mounting the attaching member 80, the same can occupy either of two positions. One is shown in Figs. 10 and 11 where the holder-engaging face 80ª extends horizontally and faces upwardly whereby the holders E can be conveniently secured thereto or removed therefrom. When a holder is occupying the horizontal position, the operator has ready access to the film face of the printing plate or negative and can do such opaquing or masking as may be necessitated by the particular requirements of the job from time to time. Obviously, the attaching block 80 and holder secured thereon are adapted to be swung to vertical operative position with the printing plate opposite and parallel with the sensitized surface.

By mounting the attaching member 80 on the slide 88 above mentioned, the face of the printing plate X' can be placed in a clearance position a short distance away from the printing plane, as shown in full lines in Fig. 12, to permit relative adjustments between these surfaces, and can also be advanced to a position in which the printing plate is in contact with said sensitized surface for printing. For this purpose, the slide 80 (see Fig. 8) is provided with one or more downwardly facing, transverse, horizontal racks 91 which are adapted to mesh with corresponding gear sectors 92 which are confined in pockets 93 in the block 51 and are rigidly secured to a horizontal rock shaft 94 journaled in the block and provided with a handle 95 at one end for operating it. By rocking the shaft 94 in one direction or the other, the slide 88 can be advanced towards or retracted from the printing plane. In order to arrest the advance movement of the slide 88 when the face of the printing plate X' arrives in the printing plane, a suitable stop 96 fixed to and extending upwardly from the projection 67 on the carriage block 51 is provided. The stop 96 extends into the path of the slide 88 so as to be engaged thereby when the slide is advanced.

It has been found that when the holders E are swung to upright position, the printing plates X' are not always exactly in parallel relation to the face of the plate X, due to slight variations in manufacture. Means are, therefore, provided to adjust the holder on the attaching member 80 about the hinge 86 to a limited extent, and to compensate for said inaccuracies, and to hold said parts firmly in adjusted position.

These means, in the construction shown, see Figs. 5 and 10, comprise a horizontal latch plate 98 slidably arranged in fixed transverse guide grooves 99 secured in a recess in the top of the slide 88. The front end of the latch plate 98 is provided with a threaded hole 100 for the reception of an operating screw 101 journalled and prevented from endwise movement in an upwardly projecting lug 102 on the slide 88, and provided at its front end with an operating handle 103. The rear end of the latch plate 98 is formed with an upstanding shoulder or hook portion 104 which is engageable with a depending part 105 on the lower end of the attaching member.

The slide 88 is also provided with a pair of transverse locking screws 106 which have threaded engagement in a pair of upwardly projecting lugs 107 on the slide 88. The rear end of each of these screws is adapted to be engaged with the front face of the part 105 of the attaching member 80 when the same is in the position shown in Fig. 10, so as to force this part against the shoulder 104 of the latch plate 98. By appropriate manipulation of the screws 106 and of the latch plate 98, the attaching member can be adjusted to a limited extent about the pivot 86, and the face of the printing plate X' positioned substantially in parallel relation to the metal plate X.

The attaching member 80 can be released from the restraint of the latch 98 and screws 106 when it is necessary to lower said member, by advancing the latch 98 to a position in which the part 105 of said member can clear the shoulder 104 of said latch plate, when the attaching member is swung about the hinge 86.

It is also desirable, especially with printing plate holders E of large size, to provide further means for bracing these holders in their upright position, and for effecting a final alinement of the plate X' with the plate X, as by the aforementioned means the holders are braced or held rigidly only at their lower edges.

Means preferably arranged on the carriage D are therefore provided for engagement with the upper portions or corners of the holders, said means acting to rigidly brace the holders when in their printing position. These means are adjustable for use with holders of different sizes, and are releasably engageable with said holders so as to be moved to position out of the path of movement of the holders as they are lowered to their horizontal or recumbent position, and to permit unobstructed access to the attaching members 80 and adjacent parts when the holders are to be attached to or removed from the apparatus. These bracing and adjusting means also have parts engageable with a holder E in its lowered position at some distance forwardly of the hinge 86 in a manner to support said holder and to prevent injury thereto should the operator bear down on the holder when attaching, removing or adjusting a printing plate thereon.

The bracing means shown for this purpose comprises a pair of extensible arms 110, see Figs. 2, 4, 11 and 13, each formed of two sections or rods 111 and 111$^a$, the latter slidably engaging in fixed sleeves 112 on the former for lengthwise adjustments relatively thereto.

Each of the rods 111 is provided at one end with a sleeve 111$^b$ by which it is swivelled or rotatably mounted on and adjustable lengthwise of a laterally-extending horizontal shaft 113 fixed in bearings 114 formed on the lugs 87 of the slide 88 of the sub-carriage, at a distance in front of the hinge rod 86. That end of each rod or section 111$^a$ which is remote from the shaft 113 is provided with a laterally projecting spring pressed and retractable locking or connecting pin 115 extending axially through a fixed boss or enlargement 116 on said rod, said pin having an operating knob 117 for retracting it. The pins extend towards each other and each is adapted to be received and fit in a hole 118, one of which is provided at each of the upper corners of each printing plate holder E. Adjacent the inner ends of the sections 111$^a$, the sections 111 of the bracing arms 110 are each provided with a sleeve 119 which is slidably mounted on and adjustable lengthwise of the same. Each sleeve is provided with a clamping screw 120 which is engageable with a face of the corresponding section for securing the sleeves in their adjusted positions. Therefore, by sliding the bracing arms 110 along the shaft 113 until said arms are substantially opposite the two side edges of the holder E then on the sub-carriage, and extending the arms obliquely towards the upper corners of said holders, and then adjusting the length of the arms by means of the sleeves 119 and clamping screws 120, the locking pins 115 can be engaged in the holes 118 in said corners of the holder.

The arms 110 are provided with means for further extending or placing them under slight tension, after the foregoing adjustments have been made, whereby the maximum rigidity of the holder E can be obtained, these means being also employed for the purpose of effecting said final accurate adjustment of the plate holders to place the face of a plate X' in the desired relation to the face of the plate X.

For this purpose, each of the sleeves 119 of the arms 110 has a lengthwise threaded hole for the reception of one threaded end of an adjusting screw 121, the other end of which is threaded in the opposite direction and is received in a correspondingly threaded hole in the adjacent end of the section 111$^a$. The screws 121 are provided with suitable enlargements or disks 122 for rotating them, so that by turning the screws in one direction or another after the sleeve 119 has been adjusted and clamped to the section 111, the pins 115 can be alined with and engaged in the holes 118, after which suitable individual manipulations of the screws 121 will cause the brace arms 110 to be tensioned, and the upper portion of the plate holder shifted until the required position of the face of the plate X' with that of the plate X is secured.

After the foregoing adjustments have been made, the printing plate X' is placed in predetermined location relative to the sensitized surface by appropriate adjustments of the main carriage C and the sub-carriage D, and should repeat prints be required in different locations, the printing plate can be moved to clearance position by merely retracting the slide 88 by means of the handle 95, and then advancing the slide when the printing plate has been adjusted to the required position.

When the holder E is to be lowered to its recumbent position for its removal or for changing the printing plates, the arms 110 are disconnected by releasing the locking pins 115 therefrom, the arms being then swung downwardly about the shaft 113 to the position shown in Figs. 2 and 11. In this position a foot piece or rest 125 extending from each sleeve 111$^b$ of the sections 111 of said arms at the opposite side of said shaft 113 relative to said arms, engages the underside or rear face of the holder E forwardly of the hinge rod 86, and acts to brace and support the holder. The ends of the foot pieces 125 are preferably curved concentrically with the axis of the shaft 113 to form bearing faces on which the holder E rests.

The different printing plates X' and consequently the corresponding plate holders E are usually of certain standard sizes, and means are therefore preferably provided whereby the bracing arms 110 can be shifted along the shaft 113 to the exact position required to place them in operative relation to a given plate holder, and for arresting and releasably holding said arms in such position without the necessity of finding each location by trial.

The shaft 113 is accordingly provided at proper intervals with transverse peripheral grooves 126 and each sleeve 111$^b$ of the arm 110 is formed with a radial hole, (see Fig. 7) extending to said shaft. At the inner end of this hole, a ball 127 is disposed and behind which is a spring 128 yieldingly pressing said ball against said shaft 113. Therefore, as the arms 110 are shifted along said shaft, the balls 127 will snap into the grooves 126. Graduations 129 designated with numbers indicating the dimensions of the various printing plates are preferably inscribed on the shaft in such relation to the grooves 126 that they cooperate with a suitable line or part of each arm, as the side face 130 of the sleeve 111$^b$, to inform an operator when the arms are in the desired position, and at which time the balls 127 will engage in the corresponding grooves 126, and yieldingly hold said arms in place during the various adjustments thereof.

As shown in Fig. 4, each of the printing plates X' will preferably have inscribed or photographed thereon the usual register marks in the form of crosses, which indicate two lines at right angles to each other intersecting at the approximate center of the subject or image on the negative or printing plate and which two lines are made accurately parallel with the horizontal and vertical travel lines, respectively, of the parts of the machine proper and which two travel lines determine the master image position for the machine and to which all adjustments are co-related in locating and positioning the prints on the sensitized plate, it being understood also that the respective horizontal and vertical scales of the machine by which the adjustments are made, are similarly co-related to such master image positions. As heretofore indicated, the printing plates or negatives will preferably be accurately located and positioned in their respective holders by a suitable registering device such as hereinbefore referred to.

As hereinbefore stated, the sensitized plates X are secured to the holder B at their upper edges and inasmuch as the holder B thus has a fixed upper edge which will be the same for all plates X, the vertical scales 24 read downwardly with reference to the upper edge of said plates. It will be noted, also, by reference to Figure 2, that the horizontal scale reads from left to right and consequently the layout sheets calling for the various locations of the subjects to be printed on the composed press plate will be given in figures calling for so many inches from the left side of the sheet, and so many inches down from the top edge.

When holders E of different sizes are employed, no difficulty will be encountered with reference to the location of the vertical center line thereof since the vertical center line of all holders and of all negatives and printing plates properly registered thereon, will always coincide with reference to the sub-carriage D due to the dowel pin attachment hereinbefore referred to. However, when holders E and corresponding printing plates X' of different vertical heights are employed, the horizontal center lines of said holders, and correspondingly the horizontal center lines of the printing plates X', will vary up and down with reference to the sub-carriage D. While these variations in the vertical height of the horizontal center line of different size holders and printing plates X' might be taken care of by proper calculations with reference to the vertical scales 24, nevertheless I deem it advisable to provide means by which these calculations may be omitted on the part of the operator, said means being so designed that for a holder E of a given vertical height, adjustment of the scale bars may be made so that the horizontal center line thereof will be made to coincide with the horizontal center line of a holder E of different vertical height when taking readings on the vertical scales 24. To accomplish this result, I employ the following means.

The pointers 27 are made adjustable vertically so that they will correctly indicate the positions of the center horizontal lines of different sizes of holders E and, correspondingly, the center horizontal lines of the printing plates X' carried thereby. The carriage C is therefore provided adjacent each of the vertical scales 24 with an auxiliary scale comprising a fixed upwardly extending post 132 secured to the top of the cross bar 15, said pointers 27 being carried by said sleeves 133 slidable on said post and adapted to be clamped thereto in any desired elevation by means of thumb screws 134. The posts 132 are graduated with lines 135 and numerals 136. While the readings on the scales 135—136 are in full units of measure corresponding to the units of measure of the scales 24, nevertheless the actual spacing of the scale units 135—136 is only half that of the spacing of the units of scales 24, for the purpose hereinafter described. Cooperable with the markings of the scales 135—136 is a pointer 137 fixed to the top of each corresponding sleeve 133.

Assuming that the holder E shown in Fig. 4 is a "12" inch holder for a plate X', then the pointer 137 is set to the 12" graduation on the post 132, after which the main carriage C is adjusted vertically to bring the pointers 27 opposite the desired graduations on the scales 24, as called for by the layout sheet. By spacing the graduations on the posts 132 in half of the units indicated, the horizontal center line of said holder (which is half-way between the top and bottom) will be placed in correct relation to the scales 24 and the top edge of the sheet metal plate X for obtaining the readings of the position of the carriage C vertically. If, now, a holder E of "24" inch size adapted for a correspondingly sized plate X', is to be positioned in the same relation to the vertical scales 24 as that just described, then the sleeves 133 will be adjusted until the pointers 137 register with the 24" graduations on said posts 132.

In the examples above given, the difference between the full vertical dimensions of the two holders is 12" and this will be approximately true of the two corresponding plates X' but, as these adjustments relate to the horizontal center lines of the holders, by which the accurate location of the holders E is determined, the actual compensation provided for by the auxiliary scales is only half of this amount, or 6", and thereafter, the correct readings for the vertical positions of the carriage C can be made by directly reading on the vertical scales 24 in order that the center of the printing plates X' will correspond with the centers called for by the layout sheet.

As shown in Fig. 4, the pointer 57 for indicating the horizontal adjustments of the printing plate X', or travel of the sub-carriage D, is arranged centrally of the latter and in alinement with the vertical axis or center of the printing plates and holders, so that by merely shifting the carriage in one direction or the other until the pointer registers with the desired reading on the horizontal scale 54, the vertical axes on the plates will be located in proper predetermined relation to the sheet metal plate.

As previously stated, the lamp housing F is mounted on a sub-carriage G which is adjustable horizontally on the main carriage C in a direction parallel with the face of the sheet metal plate X. For this purpose the main carriage is provided with a horizontal rail or track 140 rigidly secured to forwardly extending arms or brackets 141 pojecting from fixed portions 142 depending from opposite ends of the cross bar 15 of the main carriage C. The track 140 is thus disposed at some distance in front of and parallel with the cross rail 15 of the main carriage C.

The lamp housing sub-carriage G comprises three sections, a longitudinal slide 143 which is mounted on the rail or track 140 to travel lengthwise thereof to carry the lamp housing to different horizontal positions relative to the sheet metal plate X and printing plate X', a transverse slide 144 which is movable on said longitudinal slide 143 in a horizontal direction towards and from said plates to place the lamp housing F into and out of printing or exposure position, and a vertical slide 145 to which the lamp housing is directly connected and which is mounted on and adjustable vertically relative to said transverse slide for placing the horizontal axis of the lamp housing approximately in register with the center of the different printing plates and perpendicular to the latter.

The slide 143 is in turn composed of two sections, one section 146 of which operatively connects said slide 143 to the track 140 and a second section 147 is pivotally connected thereto on a horizontal axis parallel with the direction of movement and is adjustable about said axis for disposing the horizontal axis of the lamp housing in said perpendicular relation to the printing plane.

The section 146 includes a horizontal channel, the upper and lower flanges 148 of which extend rearwardly over the upper and lower edges of the rail 140 and are provided at opposite sides of said rail with horizontal guide rollers 149 which slidably engage the opposite vertical faces of said track bar. The section 146 is also provided with additional rollers 150 arranged on horizontal axes which are adapted to engage and roll on the upper and lower edges of the track 140. In this manner, the sub-carriage G is guided smoothly and steadily in its movements on the rail 140.

Extending forwardly from the vertical web 151 of the section 146 is a pair of lugs or bearing portions 152 which are adapted to receive a horizontal, lengthwise-extending hinge rod 153 on which in turn is journalled a pair of lugs 154 extending rearwardly from a vertical wall or plate 155 of the section 147 of the lateral slide 143, thus pivotally connecting the section 147 to the section 146.

The means for adjusting the section 147 about the hinge rod 153 and for holding it in adjusted position comprises a transverse, horizontal adjusting screw 157 rotatably journalled and prevented from endwise movement in a fixed lug or portion 158 depending from the plate 155 of the section 147, and which adjusting screw 157 has a threaded portion 159 operatively engaging in a depending fixed lug 160 secured to the lower face of the section 146. By rotating the screw 157 in one direction or another, the section 147 can be oscillated about the hinge pin 153 for positioning the lamp housing F for the purpose before mentioned.

The section 147 is in the form of a horizontal built-up or structural, rectangular frame of which the member 155 above mentioned forms the rear wall and to which are connected forwardly extending side plates 162 connected in turn at their front ends by a cross bar 163 and also between said ends by intermediate members 164.

The upper and lower edges of the side members 162 are arranged in parallel, horizontal relation and form guide surfaces or tracks which are engaged by rollers 165 journalled on the transverse slide 144. This slide, see Figs. 21-23, comprises vertical side members 166 which are disposed outside of and in parallel relation to the side members 162 of the longitudinal slide and are provided with studs 167 on which said rollers 165 are mounted. Rigidly connecting the side members are horizontal upper and lower cross members 168 and 169. The rear end of each of the side members 166 is provided with a rigid offset or laterally extending part 170 to each of which is secured the intermediate portion of an inwardly facing vertical guide channel 171. These channels are adapted to form guide tracks for the vertical slide 145 before mentioned. This slide comprises a horizontal lengthwise-extending cross bar 172 to each end of which is secured a vertical T-shaped bar 173. The webs of these bars 173 extend into said channels 171. At the upper end of each channel there is provided a pair of transverse guide rolls 175 between which the web of the adjacent bar 173 of the vertical slide is adapted to travel while the lower end of said web 173 is provided with a roller 176 which extends between and bears against the side flanges of the channel 171. An antifriction sliding connection is thus provided between the vertical and transverse slides.

For actuating the vertical slide, the webs of the vertical T-bars 173 are provided with vertical racks 177, and meshing with these racks are pinions 178 secured to the opposite ends of a lengthwise extending, horizontal operating shaft 179 journalled at one end in a bearing 180 on one of the channels 171. At its other end the shaft 179 extends into a casing 181 secured on the other channel 171, and within which is provided a worm wheel 182, see Fig. 17, which meshes with an operating worm 183 secured to a transverse shaft 184 journalled in said casing, and which is provided exteriorly of the latter with an operating handle 185.

By rotating said shaft 184, the vertical slide 145 can be elevated or lowered, being locked in any position by means of the worm drive.

The lamp housing F is in the form of a transversely arranged, horizontal cylinder 186 formed of sheet metal closed at one end by a wall 187 on which is supported the light, such as an arc lamp $f$. This lamp housing is rigidly secured to the vertical slide 145 in any suitable manner, as by means of brackets 188 secured to the lower side of the cylindrical wall 186 and to the top of the cross bar 172 of said slide.

From the foregoing description, it will be observed that the lamp housing F and subcarriage G can be pushed along the track 140 from one end to the other, at the front of the apparatus. The right hand end of the track, see Fig. 1 is extended beyond the corresponding upright of the main frame A, thus permitting the lamp housing and carriage to be moved out of the way and afford access to the sub-carriage D, particularly when the latter is at the right hand end of the carriage. Also, by adjusting the main carriage C downwardly to the lower end of the sensitized plate holder B, shifting the sub-carriage D to the right as above described and lowering or removing the plate holder 77 on the sub-carriage, the holder B is rendered accessible and the sheet metal plate X can be mounted on or removed from the apparatus.

After a suitable printing plate X' and holder E have been arranged on the sub-carriage D and positioned in predetermined relation to the sensitized plate X and in contact therewith, the lamp or source of light $f$ is placed back of the printing plate for making an exposure of the image thereon upon the sensitized surface. This is done by rolling the sub-carriage G along the track 140 to a position opposite the back of the printing plate, moving the transverse slide 144 towards the printing plate, and adjusting the vertical slide 145 to locate the center of the lamp housing F in line with the center of the printing plate in use.

Upon referring to Fig. 13, it will be noted that in order to afford clearance between the printing plate sub-carriage D and the lamp housing F, the inner or rear end of its cylindrical wall 186 terminates at some distance from the back of a plate holder E when the latter is in printing position. Also, the diameter of said housing is such as to afford light to the largest printing plate used on the apparatus, and consequently the light would escape outwardly around the smaller sizes of plates and affect the whole surface of the sensitized plate X.

In order to meet both of these difficulties, a set of combined light shields and extension members or hoods 190 is provided, one for use with each size of printing plate, and which is detachably secured to the open or rear end of the lamp housing, see Fig. 13.

These light shields and extension members 190 are formed of sheet metal, and each comprises a flat, circular disk 191 of substantially the same diameter as the lamp housing and to an annular flange 192 of which it is detachably secured by suitable fastening devices or clips 193.

Projecting rearwardly from and surrounding the edges of a central rectangular hole 194 in said disk is a rectangular tube, extension or hood 195, the front edges of which, when the parts are in printing position, extend into and fit the opening 78 of a printing plate holder E, see Fig. 12. The holes 194 and extensions or hoods 195 of each member 190 correspond in size to the size of the opening 78 in the plate holder with which it is to be used. These members are relatively light in weight and can be easily secured in place on the housing F, after the sub-carriages D and G have been placed in required position.

The combined weight of the main carriage, sub-carriages D and G and lamp housing F is preferably counterbalanced by weights arranged within the hollow uprights 10 of the main frame, and each of which is connected to two chains or cables 196 and 197. These chains extend upwardly over sprockets 198 and 199 at the top of each upright, one of said chains in each case being carried thence to a shackle 200 in front of the adjacent upright, while the other chain is directed across the apparatus to a third sprocket 201 on each upright, and thence to the weight at that side. The shackles 200 are in turn connected by short chains 202 to the upper ends of rods or links 203 fixed to parts at the ends of the main carriage, as for example, the parts 141.

In this manner, the variable distribution of the weight, due to the shifting of the sub-carriages D and G to different positions lengthwise of the main carriage C is compensated for and equalized.

From the preceding description, taken in connection with the drawings, it will be seen that my improved machine embodies what may be termed a "mono-rail" by and from which all the necessary adjustments of different size printing plates and holders therefor may be made and that the number of parts for carrying out these adjustments and accommodating different sizes of printing plates and holders, is reduced to a minimum. It will be seen, for instance, that a holder E of the very largest size possible to be positioned in cooperative relation with the sensitized plate may be mounted on the sub-frame D just as easily and by the same means as the smallest size holder. The arrangement provides for rapid operation and particularly cuts down the time of the operator in changing from a holder of one size to a holder of a different size and permits of the use of the lightest weight holders for any given size printing plate or negative.

By shifting the lamp housing and associated parts to the clearance position at the end of the machine and swinging the holder to the horizontal inoperative position while the main carriage C is in its lowermost position, complete access to the entire area of the sensitized plate is obtainable, either for working thereon or for interchanging plates.

Although I have herein shown and described what I now consider the preferred manner of carrying out the invention, the same is by way of illustration, only, and not by way of limitation, and all changes and modifications are contemplated that come within the scope of the claims appended hereto.

I claim as my invention:

1. In a photographic printing apparatus the combination of a flat sensitized plate, a support therefor, a main carriage, means for mounting any one of a series of printing plates of different sizes on said main carriage in parallel face to face relation to said sensitized plate, and with an edge disposed in fixed relation to said carriage, whereby the centers of plates of different sizes will be in different relative positions to said carriage, a source of light arranged in a housing adjustably mounted on said main carriage for movements parallel with the sensitized plate into and out of position at the back of the said printing plate, and means for adjusting said light housing perpendicular to said last mentioned movement and parallel with the sensitized surface, whereby said light can be placed opposite the center of any size of printing plate on said carriage.

2. In a photographic printing apparatus the combination of a flat sensitized plate, a support therefor, a main carriage, a support on said carriage on which any one of a series of printing plates of different sizes can be mounted in parallel face to face relation to said sensitized plate and with an edge thereof disposed in fixed relation to said carriage whereby the centers of plates of different sizes will be in different relative positions to said carriage, said printing plate support being adjustable in one direction on said carriage and said carriage being adjustable in a transverse direction relatively to said other adjustment for placing said printing plate in predetermined relation to said sensitized plate, means for effecting such adjustments, a source of light arranged in a housing adjustably mounted on said main carriage for movements parallel with the sensitized plate into and out of position at the back of said printing plate, and means for adjusting said light housing perpendicular to said last mentioned movement and parallel with the sensitized surface, whereby said light can be placed opposite the center of any size of printing plate on said carriage.

3. In a photographic printing apparatus, the combination of an upright main frame, a sensitized plate supported flatwise thereon in a vertical plane, a main carriage adjustably mounted on said main frame for vertical movements relatively to and parallel with said sensitized plate, a printing plate arranged in parallel face to face relation to said sensitized plate, a support on which said printing plate is secured so as to extend upwardly away therefrom, means for adjusting said support horizontally on said carriage parallel with said sensitized plate, a source of light arranged in a housing, a support therefor also mounted on said main carriage to travel horizontally thereon parallel with the path of travel of said printing plate support for placing said light into and out of operative position at the back of said printing plate, and means for effecting a vertical adjustment of said housing for placing said light opposite the centers of printing plates of different vertical dimensions.

4. In a photographic printing apparatus, the combination of a flat sensitized plate, a flat printing plate arranged in parallel face to face relation thereto, a support on which the latter is mounted so that said plate extends away therefrom with one edge in predetermined relation thereto, a source of light arranged in a housing which is movable in a path parallel with said edge of said plate to place said light at the back of said printing plate, and means for adjusting said housing in a transverse direction parallel with said plate to place said light opposite the centers of printing plates of different sizes.

5. In a photographic printing apparatus, the combination of an upright main frame, a sensitized plate supported flatwise thereon in a vertical plane, a main carriage adjustably mounted on said main frame for vertical movements relatively to and parallel with said sensitized plate, a printing plate arranged in parallel face to face relation to said sensitized plate, a support on which said printing plate is secured, guide means on said carriage for permitting said printing plate support to travel horizontally thereon parallel with said sensitized plate, a source of light arranged in a housing, a support therefor, a stationary guide member on said carriage for said support which extends parallel to said guide means and at one side thereof to permit said housing support to be shifted relatively to and past said printing plate, and means on said housing support for moving said housing in a transverse direction parallel with said sensitized plate and relatively to said guide member and said printing plate, and means for moving said housing towards and from said printing plate.

6. In a photographic printing apparatus, the combination of a rectangular main frame, a flexible sensitized plate, means for securing the latter at opposite edges and supporting it flatwise within said main frame, a carriage mounted on and extending across said frame and which is adjustable thereon parallel with said sensitized plate, a printing plate arranged in parallel face to face relation to said sensitized plate, a support on said carriage for said printing plate and which is adjustable in a direction at right angles to the direction of travel of said carriage and parallel with said sensitized plate, whereby said printing plate can be placed opposite a desired position on said sensitized plate, a source of light arranged in a housing which is also movably supported on said carriage to place said light opposite said printing plate, and said housing being movable relatively to said carriage to a position beyond a side of said main frame, and said carriage being movable to a position adjacent an edge of said sensitized plate, whereby the latter is rendered accessible and substantially unobstructed by said carriage, said printing plate support and said light housing.

7. In a photographic printing apparatus, the combination of a flat sensitized plate, a printing plate, a holder therefor, a support for said holder, attaching means on said support to which said holder is secured adjacent one edge of said plate in a manner to permit said holder to extend away from said support with said printing plate in parallel face to face relation to said sensitized plate, said attaching means being pivotally connected to said support to permit said holder to swing to a position extending in angular relation to said sensitized plate for detaching said holder from said support and said plate from said holder.

8. In a photographic printing apparatus, the combination of a flat sensitized plate, a printing plate, a holder therefor, a support for said holder, and pivoted attaching means on said support to which said holder is secured and which permits said holder to be positioned with said printing plate in face to face relation to said sensitized plate, means on said support for locking said holder in such position, and said locking means being capable of adjustment to effect a limited swinging movement of said attaching means about its pivot for placing the face of said printing plate in parallel relation to said sensitized plate.

9. In a photographic printing apparatus, the combination of a flat sensitized plate, a printing plate, a holder therefor, a support for said holder, and pivoted attaching means on said support to which said holder is secured and which permits said holder to be positioned with said printing plate in face to face relation to said sensitized plate, means on said support for locking said holder in such position, said locking means being capable of adjustment to effect a limited swinging movement of said attaching means about its pivot for placing the face of said printing plate in parallel relation to said sensitized plate, and means for moving said attaching means and the holder thereon towards said sensitized plate for placing said plates into contact for printing and for moving said parts in an opposite direction to effect clearance between said plates to permit relative parallel adjustments therebetween, a carriage on which said support is movable in one direction parallel with said sensitized plate, and said carriage being movable in a crosswise direction and parallel with said sensitized plate whereby said relative adjustments between said plates can be effected.

10. In a photographic printing apparatus, the combination of a flat, sensitized plate, a main carriage which extends across and is movable over the latter in a plane parallel therewith, a sub-carriage, a printing plate, a holder therefor, said sub-carriage having an attaching member to which said holder is detachably secured, a slide on which said attaching member is pivotally mounted to permit said holder to swing into and out of operative parallel relation to said sensitive plate with said printing plate face to face with the latter, and said slide being adjustable transversely of said sub-carriage to place said printing plate into and out of contact with said sensitized plate.

11. In a photographic printing apparatus, the combination of a flat sensitized plate, a main carriage which extends across and is movable over the latter in a plane parallel therewith, a sub-carriage, a printing plate, a holder therefor, said sub-carriage having an attaching member to which said holder is detachably secured, a slide on which said attaching member is pivotally mounted to permit said holder to swing into and out of operative parallel relation to said sensitive plate with said printing plate face to face with the latter, said slide being adjustable transversely of said sub-carriage to place said printing plate into and out of contact with said sensitized plate, means on said slide for locking said attaching member in position for supporting said holder in said operative position, and said locking means being also operable to impart a limited swinging movement of said attaching member about its pivot to place the face of said printing plate in parallel relation to said sensitized plate.

12. In a photographic printing apparatus, the combination of a flat sensitized plate, a printing plate, a holder therefor, a support for said holder to which said holder is pivotally connected adjacent an edge thereof so as to extend away therefrom in substantially parallel operative relation to said sensitized plate, bracing means on said support engageable with a part of said holder remote from said pivotal connection for bracing said holder and maintaining the printing plate thereon in parallel relation to said sensitized plate when in contact therewith.

13. In a photographic printing apparatus, the combination of a flat sensitized plate, a printing plate, a holder therefor, a support for said holder to which said holder is pivotally connected adjacent an edge thereof so as to extend away therefrom in substantially parallel operative relation to said sensitized plate, bracing means on said support engageable with a part of said holder remote from said pivotal connection for bracing said holder, said bracing means being adjustable to shift said holder about said pivotal connection for placing the face of the printing plate accurately in parallel relation to said sensitized plate.

14. In a photographic printing apparatus, the combination of a flat, sensitized plate, a printing plate, a holder therefor, a support for said holder to which said holder is pivotally connected adjacent an edge thereof so as to extend away therefrom in substantially parallel operative relation to said sensitized plate, bracing means on said support engageable with a part of said holder remote from said pivotal connection for bracing said holder, said bracing means comprising an extensible arm having two sections, one of which is adjustable relatively to the other lengthwise of said arm and is formed for an attachment to said holder, whereby, by adjusting said arm, said holder is shifted about its pivotal connection for placing the face of the printing plate accurately in parallel relation to said sensitized plate.

15. In a photographic printing apparatus, the combination of a flat sensitized plate, a printing plate, a holder therefor, a support for said holder to which said holder is pivotally connected adjacent an edge thereof so as to extend away therefrom in substantially parallel operative relation to said sensitized plate, bracing means on said support engageable with a part of said holder remote from said pivotal connection for bracing said holder, said bracing means being detachably connected to and movable away from said holder to permit the latter to swing on its pivot to an inoperative position at an angle to said sensitized plate for affording access to said printing plate, and said bracing means having a part which, when said means is moved away from said holder and the latter is swung to said inoperative position, engages a part of the holder remote from its pivot and supports said holder.

16. In a photographic printing apparatus, the combination of a sensitized plate, a printing plate arranged in face to face printing relation thereto and movable to different locations in front thereof, a source of light arranged in a housing, a sub-carriage on which said housing is supported and which is movable to place said light at the back of said printing plate for exposing an image thereon to said sensitized plate, said sub-carriage comprising a section which is movable in one direction parallel with said sensitized plate, a transverse slide mounted on said section for moving said housing towards and from said printing plate, and another slide to which said housing is attached and which is mounted on said transverse slide for adjustment in a direction perpendicular to the movements of said other slides and parallel with said sensitized plate for placing said light opposite the centers of printing plates of different sizes.

17. In a photographic printing apparatus, the combination with means for holding a sensitized plate; of a printing plate holder; a relatively elongated plate-like attaching member arranged to parallel one edge only of the plate holder; detachable cooperable means on said member and one edge only of said holder for retaining said holder in fixed predetermined position and location with respect to said member whereby all portions of said holder, with the exception of said edge, are extended away from and clear of said member; and means for effecting relative adjustment, in parallel planes, between said sensitized plate-holding means and said printing plate holder whereby the latter may be positioned opposite different portions of said sensitized plate.

18. In a photographic printing apparatus, the combination with relatively fixed means for holding a sensitized plate; of a printing plate holder; a relatively elongated plate-like attaching member arranged to parallel one edge only of the plate holder; detachable cooperable means on one edge only of said holder and said member for retaining said holder in fixed predetermined position and location with respect to said member whereby all portions of said holder, with the exception of said edge, are extended away from and clear of said member; and means for adjusting said member in two directions at right angles to each other in a plane parallel to said sensitized plate-holding means.

19. In a photographic printing apparatus, the combination with means for holding a sensitized plate; of a printing plate holder; a relatively elongated plate-like attaching member arranged to parallel one edge only of the plate holder; and means, including dowel pins and dowel openings for detachably securing one edge only of said holder on said member in fixed predetermined position whereby all portions of said holder, with the exception of said edge, are extended away from and clear of said member; and means for effecting relative adjustment, in parallel planes, between said sensitized plate-holding means and printing plate holder.

20. In a photographic printing apparatus, the combination with means for holding a sensitized plate; of a printing plate holder; a relatively elongated plate-like attaching member arranged to parallel one edge only of the plate holder; detachable cooperable means on said member and one edge only of said holder for retaining said holder in fixed predetermined position and location with respect to said member whereby all portions of said holder, with the exception of said edge, are extended away from and clear of said member; means for effecting relative adjustment, in parallel planes, between said sensitized plate-holding means and said printing plate holder whereby the latter may be positioned opposite different portions of said sensitized plate; means for adjusting said holding means and plate holder toward and from each other, to place the plates carried thereby in contact; and additional means for creating a relatively heavy pressure between such plates.

21. In a photographic printing apparatus, the combination with means for holding a sensitized plate; of a printing plate holder; a relatively elongated plate-like attaching member arranged to parallel one edge only of the plate holder; detachable cooperable means on said member and one edge only of said holder for retaining said holder in fixed predetermined position and location with respect to said member whereby all portions of said holder, with the exception of said edge, are extended away from and clear of said member; means for effecting relative adjustment, in parallel planes, between said sensitized plate-holding means and said printing plate holder whereby the latter may be positioned opposite different portions of said sensitized plate; means for adjusting said holding means and plate holder toward and from each other, to place plates carried thereby in contact; and additional means for creating a relatively heavy pressure between such plates, said last named means including devices for obtaining and producing a vacuum seal between the plates.

22. In a photographic printing apparatus, the combination with vertically disposed means for holding a sensitized plate; of a printing plate holder; a relatively elongated plate-like attaching member arranged to parallel one edge only of the plate holder; detachable cooperable means on said member and a single edge of said holder for retaining the latter in a vertical predetermined position and location with respect to said member and parallel to the sensitized plate whereby all portions of said holder, with the exception of said edge, are extended away from and clear of said member; and means for effecting relative adjustment, in parallel planes, between the sensitized plate-holding means and printing plate holder.

23. In a photographic printing apparatus, the combination with means for holding a sensitized plate; of a printing plate holder; a relatively elongated plate-like attaching member arranged to parallel one edge only of the plate holder; detachable cooperable means on said member and one edge only of said holder for retaining said holder in fixed predetermined position and location with respect to said member whereby all portions of said holder, with the exception of said edge, are extended away from and clear of said member; means for effecting relative adjustment, in parallel planes, between said sensitized plate-holding means and said printing plate holder whereby the latter may be positioned opposite different portions of said sensitized plate; and additional detachable means adjustable lengthwise and laterally for steadying the opposite unsecured edge of said holder.

24. In a photographic printing apparatus, the combination with means for holding a sensitized plate; of a printing plate holder; a relatively elongated plate-like attaching member arranged to parallel one edge only of the plate holder; detachable cooperable means on said member and one edge only of said holder for retaining the latter in fixed predetermined position and location with respect to said member whereby all portions of said holder, with the exception of said edge, are extended away from and clear of said member; supporting means on which said attaching member is adjustably mounted whereby a holder thereon is movable to operative and inoperative positions; and means for effecting relative adjustment between said sensitized plate-holding means and printing plate holder.

25. In a photographic printing apparatus, the combination with a frame; of relatively stationary sensitized plate-supporting means; a mono-rail main carriage adjustable on said frame in one direction relative to said means; a sub-carriage adjustable on said main carriage at right angles to the first named direction; means carried by said sub-carriage for detachably and fixedly securing a printing plate holder thereon in predetermined position and location, said means extending parallel to the monorail and outwardly spaced therefrom and adapted to engage one edge only of the plate holder; a second sub-carriage similarly but independently adjustably mounted on said main carriage in position to clear the first named sub-carriage; and illuminating means supported on said second sub-carriage adapted to be positioned opposite the holder in any operating position of the latter.

26. In a photographic printing apparatus, the combination with means for holding a flat sensitized plate; of means for detachably retaining any one of a series of different size printing plate holders, said means being engageable with one edge only of each plate holder, thereby leaving the opposite edge unsecured; a support on which said retaining means are carried; and bracing means carried by said support, said bracing means being adjustable and arranged to cooperably engage the unsecured edges of different size holders.

27. In a photographic printing apparatus, the combination with a support for a sensitized plate; of a main carriage adjustable in one direction in a plane parallel with the plate; a scale on said support to indicate the different adjusted positions of said main carriage; means for attaching any one of a series of different size plate holders to said carriage, each holder being secured by one edge only, whereby the centers of different size holders occupy different positions at different distances from said main carriage; and an auxiliary scale for co-relating the centers of different size holders with said first named scale, said auxiliary scale being adjustable to correspond with the different sizes of plate holders.

28. In a photographic printing apparatus, the combination with means for holding a sensitized plate in a substantially vertical position including a stationary frame; of a monorail carriage adjustably mounted on said frame to move vertically in a plane parallel to the sensitized plate; an attaching member mounted on the upper side of said carriage, said attaching member extending horizontally and constituting the uppermost portion movable with the carriage over the area of the sensitized plate; a rectangular printing plate holder; and means for detachably securing the lowermost side, only, of the plate holder to said attaching member whereby the greater portion of the plate holder including any negative carried thereby is positioned entirely above said attaching member.

29. In a photographic printing apparatus, the combination with means for holding a sensitized plate in a substantially vertical position including a stationary frame; of a monorail carriage adjustably mounted on said frame to move vertically in a plane parallel to the sensitized plate; an attaching member mounted on the upper side of said carriage, said attaching member extending horizontally and constituting the uppermost portion movable with the carriage over the area of the sensitized plate; a rectangular printing plate holder; means for detachably securing the lowermost side, only, of the plate holder to said attaching member, whereby the greater portion of the plate holder including any negative carried thereby, is positioned entirely above said attaching member; and means for adjusting said attaching member lengthwise of the main carriage.

30. In a photographic printing apparatus, the combination with means for holding a sensitized plate in a substantially vertical position including a stationary frame; of a monorail carriage adjustably mounted on said frame to move vertically in a plane parallel to the sensitized plate; an attaching member mounted on the upper side of said carriage, said attaching member extending horizontally and constituting the uppermost portion movable with the carriage over the area of the sensitized plate; a rectangular printing plate holder; means for detachably securing the lowermost side, only, of the plate holder to said attaching member whereby the greater portion of the plate holder, including any negative carried thereby, is positioned entirely above said attaching member; and means for adjusting said attaching member both lengthwise of the main carriage and in a direction toward and from the plane of the sensitized plate.

WILLIAM C. HUEBNER.